United States Patent
Chen (10) Patent No.: US 12,339,724 B2
(45) Date of Patent: Jun. 24, 2025

(54) POWER SUPPLY CONTROL METHOD AND APPARATUS, AND SERVER AND NON-VOLATILE STORAGE MEDIUM

(71) Applicant: INSPUR SUZHOU INTELLIGENT TECHNOLOGY CO., LTD., Suzhou (CN)

(72) Inventor: Zhanliang Chen, Suzhou (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 94 days.

(21) Appl. No.: 18/255,047

(22) PCT Filed: Sep. 29, 2021

(86) PCT No.: PCT/CN2021/121904
§ 371 (c)(1),
(2) Date: May 30, 2023

(87) PCT Pub. No.: WO2022/111048
PCT Pub. Date: Jun. 2, 2022

(65) Prior Publication Data
US 2024/0053812 A1    Feb. 15, 2024

(30) Foreign Application Priority Data
Nov. 30, 2020    (CN) .......................... 202011369678.9

(51) Int. Cl.
*G06F 1/00*    (2006.01)
*G06F 1/28*    (2006.01)
(Continued)

(52) U.S. Cl.
CPC . *G06F 1/30* (2013.01); *G06F 1/28* (2013.01)

(58) Field of Classification Search
CPC ..... G06F 1/30; G06F 1/28; G06F 1/26; G06F 11/1441; Y02D 10/00
See application file for complete search history.

(56) References Cited

U.S. PATENT DOCUMENTS

2007/0133139 A1*  6/2007  Orr .......................... H02M 1/36
                                                              361/62
2010/0123979 A1*  5/2010  Naito ........................ G06F 1/30
                                                              361/18
(Continued)

FOREIGN PATENT DOCUMENTS

CN    101552457 A    10/2009
CN    105378586 A     3/2016
(Continued)

OTHER PUBLICATIONS

International Search Report dated Jan. 6, 2022; International Application PCT/CN2021/121904.
(Continued)

*Primary Examiner* — Xuxing Chen
(74) *Attorney, Agent, or Firm* — Maschoff Brennan (57) ABSTRACT

A power supply control method is applied to the server, where the server includes a plurality of power supply modules. The power supply control method includes a detection step, which includes: detecting whether there is an abnormal power supply module among a plurality of power supply modules; if so, turning off all the power supply modules, and recording the number of times of turning off; if the number of times of turning off all the power supply modules is less than a pre-set number of times, powering on all the power supply modules again, and cyclically executing the detection step; and if the number of times of turning off all the power supply modules is greater than or equal to (Continued)

the pre-set number of times, maintaining all the power supply modules in a turned-off state.

16 Claims, 5 Drawing Sheets

(51) Int. Cl.
  *G06F 1/30* (2006.01)
  *G06F 11/30* (2006.01)

(56) References Cited

U.S. PATENT DOCUMENTS

| | | | |
|---|---|---|---|
| 2016/0218614 A1* | 7/2016 | Lee | G06F 1/26 |
| 2016/0378344 A1 | 12/2016 | Nachimuthu et al. | |
| 2017/0308140 A1* | 10/2017 | Shih | G06F 1/30 |
| 2018/0300239 A1* | 10/2018 | Hsu | G06F 3/0619 |
| 2020/0043529 A1* | 2/2020 | Shabbir | G06F 1/206 |
| 2020/0301495 A1 | 9/2020 | Masubuchi | |

FOREIGN PATENT DOCUMENTS

| | | | |
|---|---|---|---|
| CN | 105425932 A | | 3/2016 |
| CN | 105677588 A | | 6/2016 |
| CN | 109284207 A | | 1/2019 |
| CN | 109683696 A | | 4/2019 |
| CN | 110032264 A | | 7/2019 |
| CN | 111338455 A | | 6/2020 |
| CN | 111400153 A | | 7/2020 |
| CN | 111488233 A | | 8/2020 |
| CN | 111722975 A | | 9/2020 |
| CN | 112462920 A | | 3/2021 |
| JP | 2011109178 A | * | 6/2011 |
| WO | 2015009295 A1 | | 1/2015 |

OTHER PUBLICATIONS

The first Office Action of Corresponding Chinese application 202011369678.9 dated May 7, 2022.
Written Opinion of the International Searching Authority; International Appl. No. PCT/CN2021/121904.

* cited by examiner

POWER SUPPLY CONTROL METHOD AND APPARATUS, AND SERVER AND NON-VOLATILE STORAGE MEDIUM

CROSS-REFERENCE TO RELATED APPLICATION

This application is the U.S. National Stage of PCT/CN2021/121904 filed on Sep. 29, 2021, which claims priority of Chinese Patent Application No. 202011369678.9, entitled "Power Supply Control Method and Apparatus, and Server and Storage Medium", filed with the Chinese Patent Office on Nov. 30, 2020, which is hereby incorporated by reference in its entirety.

TECHNICAL FIELD

The present application relates to the field of power supply control, in particular to a power supply control method and apparatus, and a server and a non-volatile storage medium.

BACKGROUND

With the rapid development of information technology and the application of computers and the Internet of Things, users have higher requirements on the reliability and information processing capability of servers, and stability design of servers is paid more and more attention. Server power supply design plays an important role in ensuring server stability. In server power supply design, a programmable logic device CPLD (Complex Programmable Logic Device) is generally used to implement control and monitoring of a server power supply. Usually, the CPLD progressively performs power-on and power-down processing according to time sequence requirement of power supply control.

The inventors realized that in traditional technology, when abnormality occurs in a power supply of a server, a power-down shutdown operation is performed on the power supply of the server by a CPLD, so that the server is in a shutdown state. Hence, in the traditional technology, a unitary processing method is used in dealing with abnormality of a power supply of a server. Simply shutting down the server would affect the normal operation of the server.

SUMMARY

In a first aspect, in some embodiments, the present application discloses a power supply control method applied to a server, wherein the server includes a plurality of power supply modules, the power supply control method including:
  a detection step, which includes: detecting whether there is an abnormal power supply module among the plurality of power supply modules, and if so, turning off all the power supply modules, and recording the number of times of turning off;
  if the number of times of turning off all the power supply modules is less than a pre-set number of times, powering on all the power supply modules again, and cyclically executing the detection step; and
  if the number of times of turning off all the power supply modules is greater than or equal to the pre-set number of times, maintaining all the power supply modules in a turned-off state.

In some embodiments, the step of detecting whether there is an abnormal power supply module among the plurality of power supply modules includes:
  detecting whether there is abnormal power down in a power supply module among the plurality of power supply modules; and/or
  detecting whether there is power-on timeout in a power supply module among the plurality of power supply modules.

In some embodiments, after detecting whether there is an abnormal power supply module among the plurality of power supply modules, the power supply control method further includes:
  in response to detecting that there is abnormal power down in a power supply module among the plurality of power supply modules, acquiring target data not saved currently in the server; and
  storing the target data, and turning off all the power supply modules.

In some embodiments, the server is provided with a baseboard manager controller, and before maintaining all the power supply modules in a turned-off state, the power supply control method further includes:
  generating a power supply abnormality log, and reporting the power supply abnormality log to the baseboard manager controller, wherein the power supply abnormality log is a record log of power-on timeout and/or abnormal power down.

In a second aspect, in some embodiments, the present application provides a power supply control apparatus applied to a server, wherein the server includes a plurality of power supply modules, the power supply control apparatus including:
  a detection unit configured to execute a detection step, which includes: detecting whether there is an abnormal power supply module among the plurality of power supply modules, and if so, turning off all the power supply modules, and recording the number of times of turning off;
  a first processing unit configured to, if the number of times of turning off all the power supply modules is less than a pre-set number of times, power on all the power supply modules again, and cyclically execute the detection step; and
  a second processing unit configured to, if the number of times of turning off all the power supply modules is greater than or equal to the pre-set number of times, maintaining all the power supply modules in a turned-off state.

In some embodiments, the detection unit is further configured to detect whether there is an abnormal power supply module among a plurality of power supply modules, including:
  detecting whether there is abnormal power down in a power supply module among the plurality of power supply modules; and/or
  detecting whether there is power-on timeout in a power supply module among the plurality of power supply modules.

In some embodiments, after detecting whether there is an abnormal power supply module among the plurality of power supply modules, the power supply control apparatus further includes:
  an acquisition unit configured to, in response to detecting that there is abnormal power down in a power supply module among the plurality of power supply modules, acquire target data not saved currently in a server; and
  a storage unit configured to store the target data and turn off all the power supply modules.

In some embodiments, the server is provided with a baseboard manager controller, and before maintaining all the power supply modules in a turned-off state, the power supply control apparatus further includes:

a third processing unit configured to generate a power supply abnormality log, and report the power supply abnormality log to the baseboard manager controller, wherein the power supply abnormality log is a record log of power-on timeout and/or abnormal power down.

In a third aspect, in some embodiments, the present application discloses a server including a memory and a processor, wherein the memory is configured to store computer-readable instructions; and the computer-readable instructions, when executed by the processor, cause the processor to execute the following steps:

a detection step, which includes: in response to detecting an abnormal power supply module among the plurality of power supply modules, turning off all the power supply modules, and recording the number of times of turning off;

in response to detecting that the number of times of turning off all the power supply modules is less than a pre-set number of times, powering on all the power supply modules again, and cyclically executing the detection step; or in response to detecting that the number of times of turning off all the power supply modules is greater than or equal to the pre-set number of times, maintaining all the power supply modules in a turned-off state.

In a fourth aspect, in some embodiments, the present application provides one or more non-volatile readable storage medium configured to store computer-readable instructions, wherein the computer-readable instructions, when executed by a processor, implement the following steps:

a detection step, which includes: in response to detecting an abnormal power supply module among a plurality of power supply modules, turning off all the power supply modules, and recording the number of times of turning off;

in response to detecting that the number of times of turning off all the power supply modules is less than a pre-set number of times, powering on all the power supply modules again, and cyclically executing the detection step; or in response to detecting that the number of times of turning off all the power supply modules is greater than or equal to the pre-set number of times, maintaining all the power supply modules in a turned-off state.

BRIEF DESCRIPTION OF THE DRAWINGS

To describe technical solutions in embodiments of the present application more clearly, drawings to be used in description of the embodiments will be introduced briefly below. Obviously, the drawings described below represent some embodiments of the present application, and those of ordinary skill in the art can obtain other drawings according to these drawings without creative work.

DETAILED DESCRIPTION

By providing a power supply control method, embodiments of the present application solve the technical problem that in the traditional technology, a unitary processing method is used in dealing with abnormality of a power supply of a server.

To solve the above technical problem, a general ideal of a technical solution of embodiments of the present application is as follows:

A power supply control method applied to a server, wherein the server includes a plurality of power supply modules, the power supply control method including: a detection step, which includes: detecting whether there is an abnormal power supply module among the plurality of power supply modules, and if so, turning off all the power supply modules, and recording the number of times of turning off; and if the number of times of turning off all the power supply modules is less than a pre-set number of times, powering on all the power supply modules again, and cyclically executing the detection step; or if the number of times of turning off all the power supply modules is greater than or equal to the pre-set number of times, maintaining all the power supply modules in a turned-off state.

In the above power supply control method, a detection step is carried out first, which includes: detecting whether there is an abnormal power supply module among the plurality of power supply modules, and if so, turning off all the power supply modules, and recording the number of times of turning off; and if the number of times of turning off all the power supply modules is less than a pre-set number of times, powering on all the power supply modules again, and cyclically executing the detection step; or if the number of times of turning off all the power supply modules is greater than or equal to the pre-set number of times, maintaining all the power supply modules in a turned-off state. To better understand the above technical solution, the above technical solution is described in detail below in conjunction with the drawings of the description and specific implementations.

First, it is to be noted that the term "and/or" herein merely represents an association relationship describing associated objects, indicating there may be three relationships. For example, A and/or B may indicate three situations: A exists alone; both A and B exist; and B exists alone. In addition, the character "/" herein generally indicates that the associated objects prior to and following it are in an "or" relationship.

Embodiment 1

Figure 1:
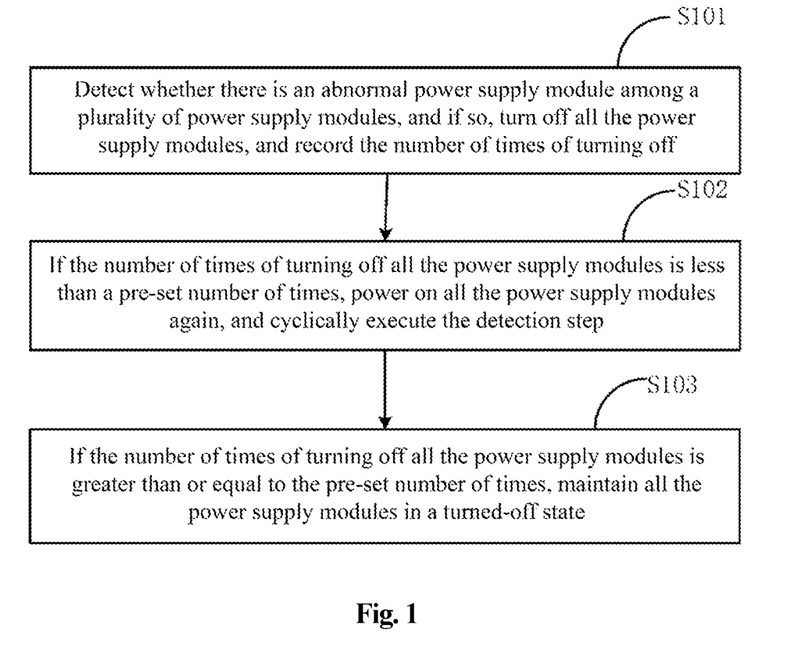
FIG. 1 is a flow diagram of a power supply control method in one or more embodiments.
Figure 2:
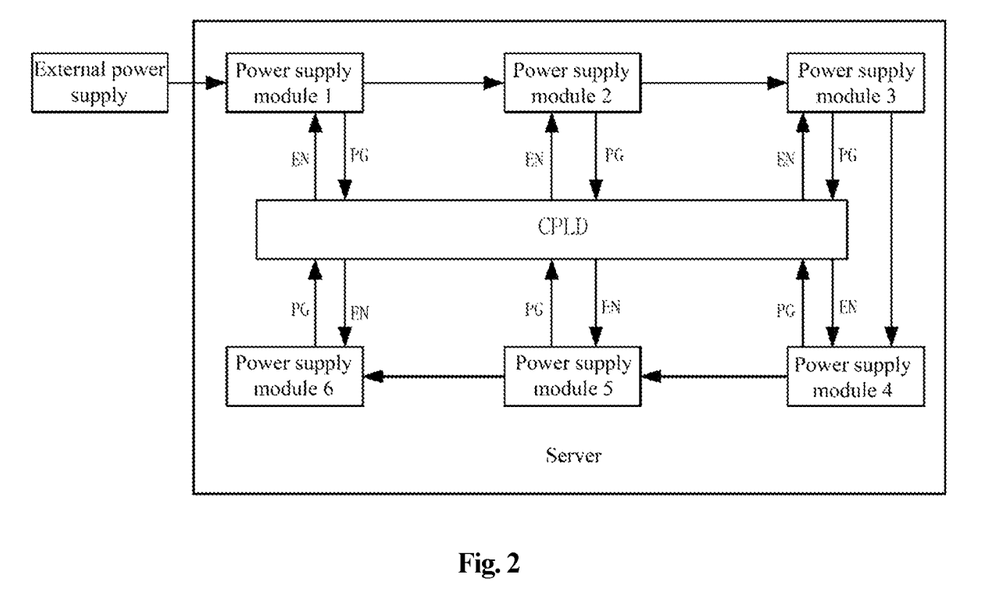
FIG. 2 is a power-on sequence diagram of powering on a plurality of power supply modules in one or more embodiments.

The present application discloses a power supply control method, which is applied to a server, as shown in FIG. 2, and specifically may be applied to a CPLD of a server. The CPLD sends signals to power supply modules to achieve the purpose of detecting the power supply modules. As shown in FIG. 1, the power supply control method includes the following steps:

Step S101: detecting whether there is an abnormal power supply module among the plurality of power supply modules, and if so, turning off all the power supply modules, and recording the number of times of turning off;

Step S102: if the number of times of turning off all the power supply modules is less than a pre-set number of times, powering on all the power supply modules again, and cyclically executing the detection step; and Step S103: if the number of times of turning off all the power supply modules is greater than or equal to the pre-set number of times, maintaining all the power supply modules in a turned-off state.

The power supply control method disclosed in the present application can be applied in various servers. The server includes a plurality of power supply modules, wherein each power supply module can supply power to components in the server. When the plurality of power supply modules are powered on, a power-on operation can be performed according to a pre-set power-on timing sequence. Using a server containing 6 power supply modules as an example, referring to FIG. 2, which is a power-on sequence diagram of powering on a plurality of power supply modules, the power-on of the power supply modules inside the server is time-sequential power-on. That is, power is supplied is from an external power supply, and then the power supply modules are successively powered on in chronological order from a power supply module 1 to a power supply module 6, and the power-on of the power supply modules is detected by a CPLD. For the sake of illustration, an x86 server is used as an example for description.

During specific implementation, first, step S101 is performed: detecting whether there is an abnormal power supply module among the plurality of power supply modules, and if so, turning off all the power supply modules, and recording the number of times of turning off.

Specifically, in the process of powering on the plurality of power supply modules in the server, the CPLD sends an EN signal to the power supply modules, EN indicating enable. If a power supply module is in a normal state, the power supply module will feed back to the CPLD a PG signal that meets a pre-set condition, after receiving the EN signal, to indicate that the power supply module is powered on normally, PG indicating power good. If no PG signal fed back from the power supply module is received within a predetermined period of time, or a PG signal received by the CPLD does not meet the pre-set condition, after the CPLD sends the EN signal, it indicates that the power supply module is abnormal. For example, the pre-set condition is that when an EN signal is high level, a fed back PG signal is also high level. If a fed back PG signal received after the CPLD sends a high level EN signal is low level, it indicates that the power supply module is abnormal. After detecting that there is an abnormal power supply module, the CPLD turns off all the power supply modules, and records the number of times of turning off the power supply modules. For example, if the CPLD finds abnormality when the power supply module 3 is powered on, the CPLD turns off all the power supply modules, and records the number of times of power-off as 1.

In an embodiment of the present application, detecting whether there is an abnormal power supply module may be implemented by: detecting whether there is abnormal power down in a power supply module among the plurality of power supply modules; and/or detecting whether there is power-on timeout in a power supply module among the plurality of power supply modules.

During specific implementation, the detection of abnormal power down and/or power-on timeout can be set according to actual needs. In the following, two abnormal power down detection methods and two power-on timeout detection methods are described.

Figure 3:
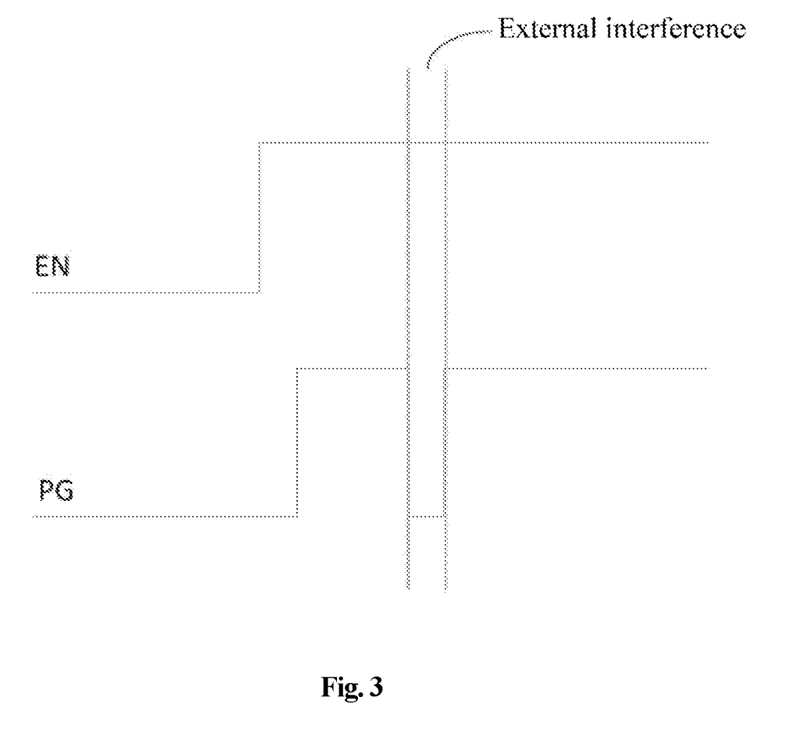
FIG. 3 is a timing-sequence diagram of an EN signal and a PG signal with external interference in one or more embodiments.

Two detection methods for abnormal power down:
(1) When the external power supply powers on a power supply module, the CPLD sends a high level EN signal to the power supply module that is being powered on; the power supply module feeds back a high level PG signal to the CPLD; when a PG signal fed back by the power supply module is low level, it indicates that the power supply module is abnormally powered down.
(2) Since the interference of an external signal leads to a burr signal in part of a PG signal, if a burr signal is detected when the CPLD detects a power supply module, the CPLD determines that the power supply module is abnormally powered down, referring to FIG. 3. This can be solved by powering on the power supply modules of the server again.

Figure 4:
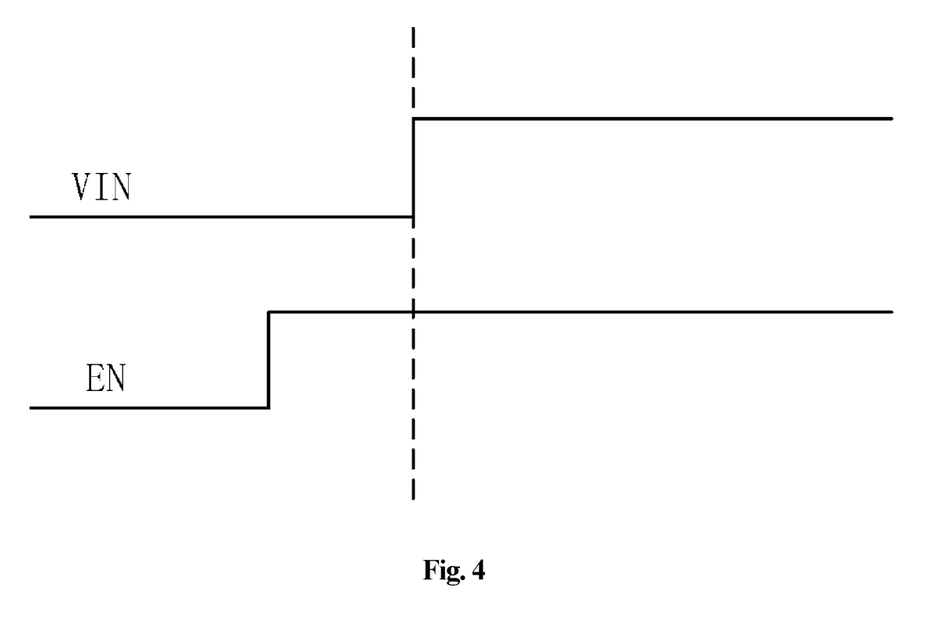
FIG. 4 is a schematic diagram of an EN signal and a VIN signal when power-on timeout occurs in a power supply module in one or more embodiments.

Two detection methods for power-on timeout:
(1) When a power supply module in the server is powered on, the CPLD sends an EN signal to the power supply module being powered on; if the CPLD does not receive a PG signal fed back from the power supply module, it determines power-on timeout of the power supply module.
(2) When an EN signal received by a power supply module being powered on is valid before VIN (an input voltage of the external power supply), the problem of probable failure to power on, i.e., power-on timeout, occurs in some power supply modules, referring to FIG. 4, which is a schematic diagram of an EN signal and a VIN signal when power-on timeout occurs in a power supply module.

In an embodiment of the present application, after detecting whether there is an abnormal power supply module among the plurality of power supply modules, the method further includes:
in response to detecting that there is abnormal power down in a power supply module among the plurality of power supply modules, acquiring target data not saved currently in the server; and
storing the target data, and turning off all the power supply modules.

Specifically, in traditional technology, when sudden power off or other power supply abnormality occurs, the server is directly powered off, which will cause loss of a lot of data. In embodiments of the present application, a mechanism for storing data in the server when abnormal power down occurs is introduced.

When abnormal power down occurs in a power supply module, an ADR (Asynchronous DRAM Refresh) mechanism can be triggered to store data that is not saved currently. The working mechanism of ADR is: when the CPLD detects abnormal power off of the power supply, the CPLD notifies a CPU (Central Processing Unit) and a PCH (Platform Controller Hub, also known as integrated south bridge) to perform data caching for the data that is not saved currently, and then store the cached data.

Figure 5:
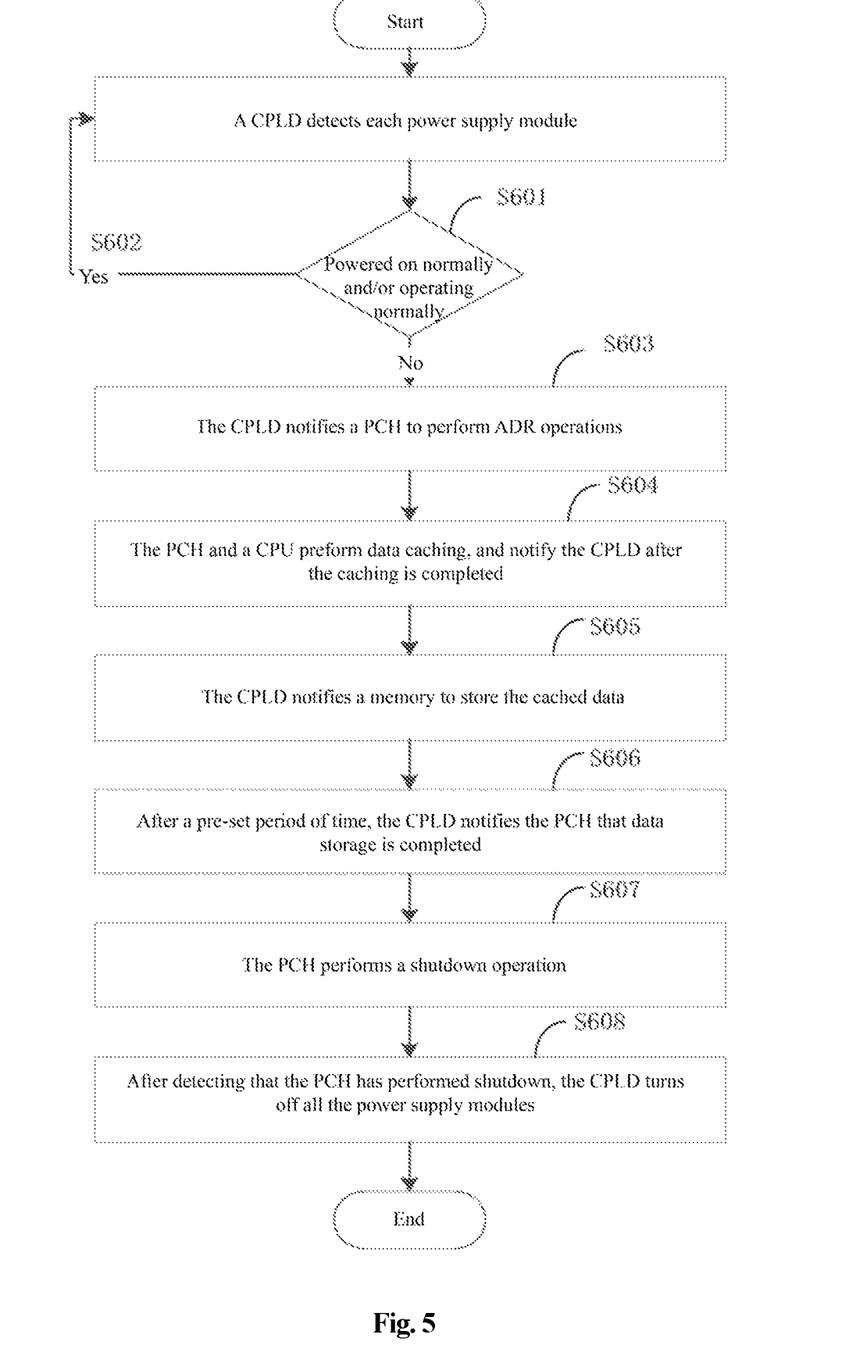
FIG. 5 is a flow diagram of abnormal power down data storage in one or more embodiments.

An abnormal power down data storage process is described below, a specific implementation process of which is shown in FIG. 5:

Step S601: detecting each power supply module by a CPLD, and determining whether each power supply module is powered on normally and/or operating normally; and if so, executing step S602, or if not, executing step S603;

Step S602: cyclically detecting each power supply module;

Step S603: the CPLD notifying, by pulling down an ADR TRIGGER N signal, a PCH to perform ADR operations;

Step S604: after the PCH receives the notification from the CPLD, the PCH and CPU starting writing unsaved data to a cache;

Step S605: after the writing to the cache by the PCH and the CPU is completed, notifying the CPLD via an ADRCOMPLETE signal, and after receiving the notification, the CPLD further notifying a memory to read and store the cached unsaved data; and Step S606: after a pre-set period of time, the CPLD notifying the PCH that data storage is completed, wherein the pre-set time is time for the memory to store the data, and may be 50-100 us;

Step S607: after the PCH receives the notification from the CPLD, starting shutdown; and Step S608: after the CPLD detects that the PCH has performed shutdown, turning off all the power supply modules.

Further, step S102 is performed: if the number of times of turning off all the power supply modules is less than a pre-set number of times, powering on all the power supply modules again, and cyclically executing the detection step.

The above-mentioned ADR TRIGGER N signal and ADR COMPLETE signal are common signal names for Intel servers. Specifically see the Intel company's PDG (Platform Design Guide) document, Reference Number 574174. The aforementioned Intel servers include servers on the Intel Whitely platform, where Whitely is a platform code name for Intel servers. Specifically, if the number of times of turning off the power supply is less than a pre-set number of times, the CPLD powers on the power supply modules again based on a normal time-sequential power-on process, and continues detecting the power supply modules during the power-on process and during operation of the power supply modules. The pre-set number of times can be set according to actual needs. Using the pre-set number of times being 3 as an example, the CPLD performs a time-sequential power-on operation on the power supply modules, and detects the power supply modules when powering on the same. If abnormal power down or power-on timeout occurs in one of the power supply modules, the CPLD turns off the power supply modules and records the number of times of turning off as 1. Then, the power supply modules are powered on again, and the detection process is repeated. If abnormal power down or power-on timeout occurs in a power supply module, the CPLD turns off the power supply modules and records the number of times of turning off as 2, and the CPLD powers on the power supply modules again and performs the detection process, until the number of times of abnormality of the power supply modules reaches the pre-set number of times.

Further, step S103 is performed: if the number of times of turning off all the power supply modules is greater than or equal to the pre-set number of times, maintaining all the power supply modules in a turned-off state.

Specifically, in the case of abnormality of a power supply module, if the number of times recorded after the CPLD turns off the power supply modules is greater than or equal to the pre-set number of times, it indicates that failure may occur in server hardware and it needs power-off analysis and processing, so the CPLD no longer powers on the power supply modules again, but maintains a shutdown state. For example, the pre-set number of times is 3, and after the CPLD turns off the power supply modules for the third time, i.e., the recorded number of times is 3, the CPLD no longer powers on the power supply modules again, but maintains a shutdown state to wait for maintenance by a user.

In an embodiment of the present application, a processing log is reported to a baseboard manager controller before the power supply modules are maintained in the turned-off state.

The baseboard manager controller (BMC) is a standalone controller that records information and log records of various hardware. Specifically, when the number of times of turning off the power supply modules by the CPLD reaches a pre-set number of times, the power-on timeout and abnormal power down in the power supply module in the server may be caused by a hardware problem, and at that time, the hardware problem needs to be analyzed in time. To avoid further damage to the hardware, the CPLD no longer powers on the power supply modules again. In order to facilitate maintenance by a user, the CPLD reports a power supply abnormality log to the BMC for the user's reference. The power supply abnormality log may describe which power supply module is abnormal, what abnormality has occurred, etc.

Figure 6:
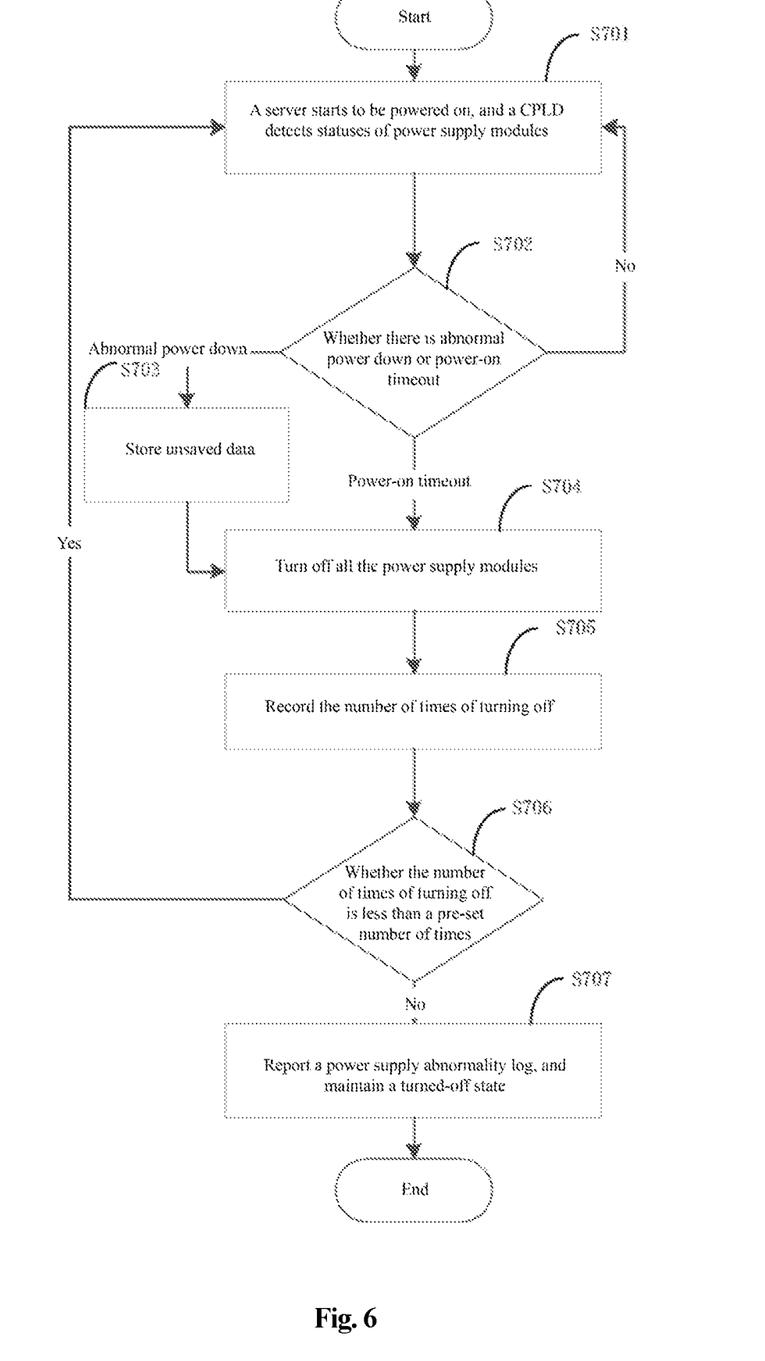
FIG. 6 is a flow diagram of power supply control in one or more embodiments.

To better explain Embodiment 1 of the present application, a power supply control flow diagram is disclosed here, as shown in FIG. 6:

Step S701: starting powering on power supply modules of a server, while detecting power-on statuses of the power supply modules by a CPLD;

Step S702: determining whether there is abnormal power down and/or power-on timeout; and if there is abnormal power down, executing step S703; if there is power-on timeout, executing step S704; or if there is no abnormal power down and/or power-on timeout, executing step S701;

Step S703: storing unsaved data by an ADR mechanism, and then executing step S704;

Step S704: the CPLD turning off all the power supply modules;

Step S705: after turning off all the power supply modules, recording the number of times of turning off;

Step S706: determining whether the number of times of turning off is less than a pre-set number of times, and if so, executing step S701, or if not, executing step S707;

Step S707: reporting a power supply abnormality log, and maintaining a turned-off state of the power supply modules.

The above technical solution in embodiments of the present application at least has the following technical effects or advantages:

Due to providing the detection step, when abnormality occurs in a power supply module of the server, it can be detected quickly, and the power supply may be turned off in time to prevent the occurrence of short circuiting and the like. In addition, by recording the number of times of turning off the power supply, and performing the operation of powering on the power supply of the server again if the pre-set number of times is met, it ensures that when certain server power supply abnormality problems that may be solved simply by restarting the server occur, the server can be timely restarted and restored to a working state. The above power supply control method may solve the technical problem that in the traditional technology, a unitary processing method is used in dealing with abnormality of a power supply of a server, and achieves the purpose of effectively dealing with abnormality of a power supply of a server.

Embodiment 2

Figure 7:
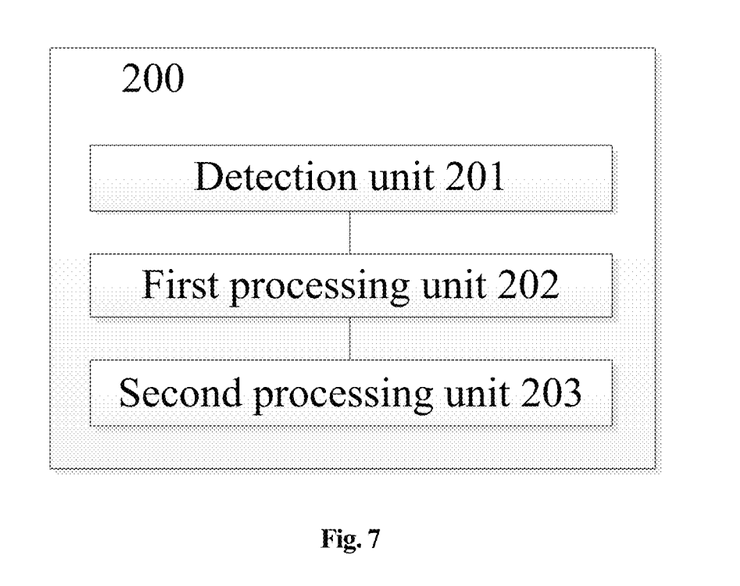
FIG. 7 is a schematic diagram of a power supply control apparatus in one or more embodiments.

Based on the same inventive concept, as shown in FIG. 7, the present application also discloses a power supply control apparatus 200, including:

a detection unit 201 configured to execute a detection step, which includes: detecting whether there is an abnormal power supply among a plurality of power supply modules, and if so, turning off all the power supply modules, and recording the number of times of turning off;

a first processing unit 202 configured to, if the number of times of turning off all the power supply modules is less than a pre-set number of times, power on all the power supply modules again, and cyclically execute the detection step; and a second processing unit 203 configured to, if the number of times of turning off all the power supply modules is greater than or equal to the pre-set number of times, maintaining all the power supply modules in a turned-off state.

In an embodiment of the present application, the detection unit is configured to detect whether there is an abnormal power supply module among a plurality of power supply modules, including:

detecting whether there is abnormal power down in a power supply module among the plurality of power supply modules; and/or detecting whether there is power-on timeout in a power supply module among the plurality of power supply modules.

In an embodiment of the present application, after detecting whether there is an abnormal power supply module among the plurality of power supply modules, the power supply control apparatus further includes:

an acquisition unit configured to, in response to detecting that there is abnormal power down in a power supply module among the plurality of power supply modules, acquire target data not saved currently in a server; and a storage unit configured to store the target data and turn off all the power supply modules.

In an embodiment of the present application, the server is provided with a baseboard manager controller, and before maintaining all the power supply modules in a turned-off state, the apparatus further includes:

a third processing unit configured to generate a power supply abnormality log, and report the power supply abnormality log to the baseboard manager controller, wherein the power supply abnormality log is a record log of power-on timeout and/or abnormal power down.

Regarding the above apparatus, the specific functions of the units therein have been described in detail in the embodiment of the power supply control method disclosed in the present application, and will not be detailed here.

Embodiment 3

Figure 8:
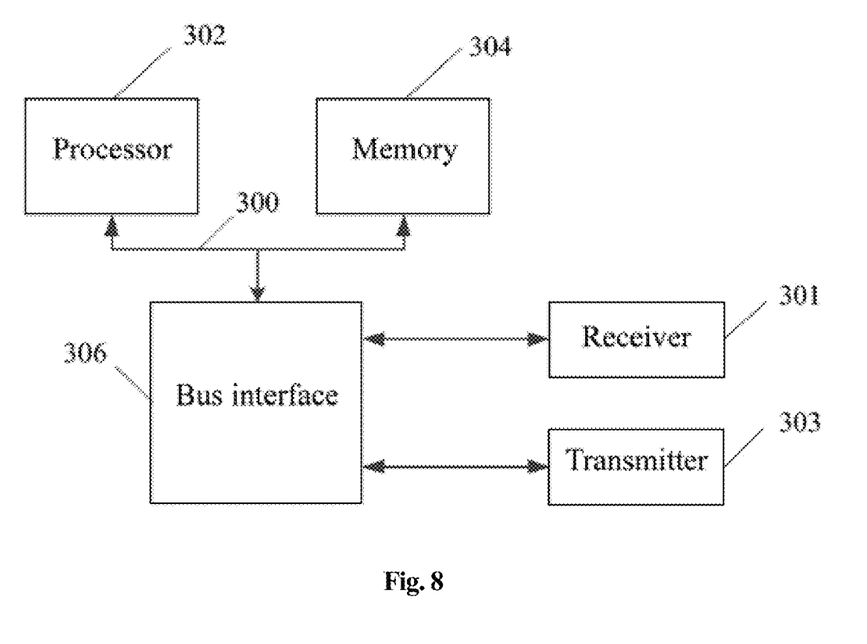
FIG. 8 is a schematic diagram of a server in one or more embodiments.

Based on the same inventive concept as the power supply control method in the preceding embodiment, the present application also discloses a server, as shown in FIG. 8, including: a memory 304, a processor 302, and computer-readable instructions that are stored in the memory 304 and run on the processor 302. The processor 302 implements the following steps when executing the computer-readable instructions:

a detection step, which includes: in response to detecting an abnormal power supply module among the plurality of power supply modules, turning off all the power supply modules, and recording the number of times of turning off;

in response to detecting that the number of times of turning off all the power supply modules is less than a pre-set number of times, powering on all the power supply modules again, and cyclically executing the detection step; or in response to detecting that the number of times of turning off all the power supply modules is greater than or equal to the pre-set number of times, maintaining all the power supply modules in a turned-off state.

In an embodiment, when executing the computer-readable instructions, the processor 302 implements the step of detecting an abnormal power supply module among the plurality of power supply modules, including: detecting whether there is abnormal power down in a power supply module among the plurality of power supply modules; and/or detecting whether there is power-on timeout in a power supply module among the plurality of power supply modules.

In an embodiment, the processor 302 further implements the following steps when executing the computer-readable instructions: after detecting an abnormal power supply module among the plurality of power supply modules, in response to detecting abnormal power down in a power supply module among the plurality of power supply modules, acquiring target data not saved currently in the server; and storing the target data, and turning off all the power supply modules.

In an embodiment, the server is provided with a baseboard manager controller, and before the processor 302 further implements the step of maintaining all the power supply modules in a turned-off state when executing the computer-readable instructions, the processor 302 further implements the following steps when executing the computer-readable instructions: generating a power supply abnormality log, and reporting the power supply abnormality log to the baseboard manager controller, wherein the power supply abnormality log is a record log of power-on timeout and/or abnormal power down.

In FIG. 8, which shows a bus architecture (represented by a bus 300), the bus 300 may include any number of interconnected buses and bridges, and the bus 300 links various circuits together including one or more processors represented by a processor 302 and memories represented by a memory 304. The bus 300 may also link various other circuits together such as periphery devices, and voltage stabilizer and power management circuits, which are all known in the art and thus not will not be further described herein. A bus interface 306 provides interfacing between the bus 300, and a receiver 301 and a transmitter 303. The receiver 301 and the transmitter 303 may be a same element, i.e., a transceiver, providing a unit for communicating with various other apparatuses over a transmission medium. The processor 302 is responsible for managing the bus 300 and general processing, and the memory 304 may be configured to store data to be used when the processor 302 performs operations.

Embodiment 4

Based on the same inventive concept, the present application also discloses one or more non-volatile readable storage medium configured to store computer-readable instructions, wherein the computer-readable instructions, when executed by a processor, implement the following steps:

a detection step, which includes: in response to detecting an abnormal power supply module among a plurality of power supply modules, turning off all the power supply modules, and recording the number of times of turning off;

in response to detecting that the number of times of turning off all the power supply modules is less than a pre-set number of times, powering on all the power supply modules again, and cyclically executing the detection step; or in response to detecting that the number of times of turning off all the power supply modules is greater than or equal to the pre-set number of times, maintaining all the power supply modules in a turned-off state.

In an embodiment, the computer-readable instructions, when executed by the processor, implement the step of detecting an abnormal power supply module among the plurality of power supply modules, including: detecting whether there is abnormal power down in a power supply module among the plurality of power supply modules; and/or detecting whether there is power-on timeout in a power supply module among the plurality of power supply modules.

In an embodiment, the computer-readable instructions, when executed by the processor, further implement the following steps: after detecting an abnormal power supply module among the plurality of power supply modules, in response to detecting abnormal power down in a power supply module among the plurality of power supply modules, acquiring target data not saved currently in the server; and storing the target data, and turning off all the power supply modules.

In an embodiment, the server is provided with a baseboard manager controller, and before the computer-readable instructions, when executed by the processor, implement the step of maintaining all the power supply modules in a turned-off state, the computer-readable instructions, when executed by the processor, further implement the following steps: generating a power supply abnormality log, and reporting the power supply abnormality log to the baseboard manager controller, wherein the power supply abnormality log is a record log of power-on timeout and/or abnormal power down.

Those skilled in the art shall appreciate that embodiments of the present application may be embodied as a method, a system, or a medium product. Therefore, the present application may be embodied in the form of an all-hardware embodiment, an all-software embodiment or an embodiment of software and hardware in combination. Furthermore, the present application may be embodied in the form of a computer-readable instruction product implemented in one or more non-volatile storage medium (including but not limited to a disk memory, a CD-ROM, an optical memory, etc.) in which computer-readable instructions are contained.

The present application is described with reference to a flow diagram and/or block diagram of the method, device (system) and computer-readable instruction product according to embodiments of the present application. It shall be understood that respective flows and/or blocks in the flow diagram and/or the block diagram and combinations of the flows and/or the blocks in the flow diagram and/or the block diagram may be implemented by computer-readable instructions. These computer-readable instructions may be provided to a general-purpose computer, a specific-purpose computer, an embedded processor, or a processor of another programmable data processing device to produce a machine so that the instructions executed by the computer or the processor of the other programmable data processing device create means for performing the functions specified in the flow(s) of the flow diagram and/or the block(s) of the block diagram.

These computer-readable instructions may also be stored in a computer-readable memory capable of directing the computer or the other programmable data processing device to operate in a specific manner so that the instructions stored in the computer readable memory create an article of manufacture including instruction means which implements the functions specified in the flow(s) of the flow diagram and/or the block(s) of the block diagram.

These computer-readable instructions may also be loaded onto the computer or the other programmable data processing device so that a series of operational steps are performed on the computer or the other programmable data processing device to create a computer implemented process so that the instructions executed on the computer or the other programmable device provide steps for implementing the functions specified in the flow(s) of the flow diagram and/or the block(s) of the block diagram.

Although some embodiments of the present application have been described, additional variations and modifications of these embodiments can be made by those skilled in the art upon learning the basic inventive concept. It is therefore intended that the appended claims are interpreted as including the preferred embodiments and all such alterations and modifications that fall within the scope of the present application.

Evidently, those skilled in the art can make various modifications and variations to the present application without departing from the spirit and scope of the present application. Thus, the present application is also intended to encompass these modifications and variations thereto so long as the modifications and variations to the present application come into the scope of the claims appended to the present application and their equivalents.

What is claimed is:

1. A power supply control method applied to a server, wherein the server comprises a plurality of power supply modules, the method comprising:
   a detection step, which comprises: in response to detecting an abnormal power supply module among the plurality of power supply modules, turning off all the power supply modules, and recording the number of times of turning off;
   in response to detecting that the number of times of turning off all the power supply modules is less than a pre-set number of times, powering on all the power supply modules again, and cyclically executing the detection step; or
   in response to detecting that the number of times of turning off all the power supply modules is greater than or equal to the pre-set number of times, maintaining all the power supply modules in a turned-off state;
   wherein the step of detecting an abnormal power supply module among the plurality of power supply modules comprises: detecting abnormal power down in a power supply module among the plurality of power supply modules; and/or detecting power-on timeout in a power supply module among the plurality of power supply modules;

wherein the step of detecting abnormal power down in a power supply module among the plurality of power supply modules comprises:

on condition that detecting the multiple power modules, a burr signal is detected in Power Good (PG) signals which are emitted by a power supply module among the plurality of power supply modules.

2. The power supply control method according to claim 1, wherein the method further comprises: after detecting an abnormal power supply module among the plurality of power supply modules, in response to detecting abnormal power down in a power supply module among the plurality of power supply modules, acquiring target data not saved currently in the server; and storing the target data, and turning off all the power supply modules.

3. The power supply control method according to claim 2, wherein the step of storing the target data comprises:

notifying a Central Processing Unit (CPU) and a Platform Controller Hub (PCH) to cache the target data;
storing the cached target data.

4. The power supply control method according to claim 1, wherein the server is provided with a baseboard manager controller, and before maintaining all the power supply modules in a turned-off state, the method further comprises:

generating a power supply abnormality log, and reporting the power supply abnormality log to the baseboard manager controller, wherein the power supply abnormality log is a record log of power-on timeout and/or abnormal power down.

5. The power supply control method according to claim 1, wherein the step of detecting an abnormal power supply module among the plurality of power supply modules comprises:

in response to detecting that after a power supply module among the plurality of power supply receiving an Enable (EN) signal detecting, no PG signal fed back from the power supply module is received within a predetermined period of time.

6. The power supply control method according to claim 1, wherein the step of detecting an abnormal power supply module among the plurality of power supply modules comprises:

in response to detecting that after a power supply module among the plurality of power supply receiving an EN signal, a PG signal fed back from the power supply module does not meet a pre-set condition.

7. The power supply control method according to claim 6, wherein the pre-set condition comprises: the EN signal is high level, the PG signal is high level.

8. The power supply control method according to claim 1, wherein the step of detecting abnormal power down in a power supply module among the plurality of power supply modules comprises:

in response to detecting that a power supply module supplied powers by an external power among the plurality of power supply modules, and on the condition that a power supply power module being powered after receiving a high level EN signal, feedbacks a low level PG signal.

9. The power supply control method according to claim 1, wherein further comprising:

re-supplying to a power supply which emits the burr signal to solve the burr signal.

10. The power supply control method according to claim 1, wherein the step of detecting power-on timeout in a power supply module among the plurality of power supply modules comprises:

in response to detecting that after a power supply module among the plurality of power supply modules receiving an EN signal, no PG signal fed back from the power supply module is received.

11. The power supply control method according to claim 1, wherein the step of detecting power-on timeout in a power supply module among the plurality of power supply modules comprises:

in response to detecting that an EN signal received by a power supply module among the plurality of power supply modules is valid before an input voltage (VIN).

12. The power supply control method according to claim 1, wherein further comprising:

On the condition that the plurality of power supply modules are powered on, a power-on operation can be performed according to a pre-set power-on timing sequence.

13. A server, comprising a processor and a memory, wherein the memory, configured to store computer-readable instructions; and the computer-readable instructions, when executed by the processor, cause the processor to execute the following steps:

a detection step, which comprises: in response to detecting an abnormal power supply module among the plurality of power supply modules, turning off all the power supply modules, and recording the number of times of turning off;

in response to detecting that the number of times of turning off all the power supply modules is less than a pre-set number of times, powering on all the power supply modules again, and cyclically executing the detection step; or in response to detecting that the number of times of turning off all the power supply modules is greater than or equal to the pre-set number of times, maintaining all the power supply modules in a turned-off state;

wherein the step of detecting an abnormal power supply module among the plurality of power supply modules comprises: detecting abnormal power down in a power supply module among the plurality of power supply modules; and/or detecting power-on timeout in a power supply module among the plurality of power supply modules;

wherein the step of detecting abnormal power down in a power supply module among the plurality of power supply modules comprises:

on condition that detecting the multiple power modules, a burr signal is detected in PG signals which are emitted by a power supply module among the plurality of power supply modules.

14. The server according to claim 13, wherein the computer-readable instructions, when executed by the processor, cause the processor to further execute the following step: after detecting an abnormal power supply module among the plurality of power supply modules, in response to detecting abnormal power down in a power supply module among the plurality of power supply modules, acquiring target data not saved currently in the server; and storing the target data, and turning off all the power supply modules.

15. The server according to claim 13, wherein the server is provided with a baseboard manager controller, and before maintaining all the power supply modules in a turned-off state, the computer-readable instructions, when executed by the processor, cause the processor to further execute the following step:

generating a power supply abnormality log, and reporting the power supply abnormality log to the baseboard manager controller, wherein the power supply abnormality log is a record log of power-on timeout and/or abnormal power down.

16. One or more non-transitory computer-readable storage medium, configured to store computer-readable instructions, wherein the computer-readable instructions, when executed by one or more processors, cause the one or more processors to execute the following steps:

a detection step, which comprises: in response to detecting an abnormal power supply module among the plurality of power supply modules, turning off all the power supply modules, and recording the number of times of turning off;

in response to detecting that the number of times of turning off all the power supply modules is less than a pre-set number of times, powering on all the power supply modules again, and cyclically executing the detection step; or in response to detecting that the number of times of turning off all the power supply modules is greater than or equal to the pre-set number of times, maintaining all the power supply modules in a turned-off state;

wherein the step of detecting an abnormal power supply module among the plurality of power supply modules comprises: detecting abnormal power down in a power supply module among the plurality of power supply modules; and/or detecting power-on timeout in a power supply module among the plurality of power supply modules;

wherein the step of detecting abnormal power down in a power supply module among the plurality of power supply modules comprises:

on condition that detecting the multiple power modules, a burr signal is detected in PG signals which are emitted by a power supply module among the plurality of power supply modules.

\* \* \* \* \*